UNITED STATES PATENT OFFICE.

ALEXANDER P. ASHBOURNE, OF OAKLAND, CALIFORNIA.

IMPROVEMENT IN PROCESSES FOR PREPARING COCOA-NUT FOR DOMESTIC USE.

Specification forming part of Letters Patent No. 163,962, dated June 1, 1875; application filed April 15, 1875.

*To all whom it may concern:*

Be it known that I, ALEXANDER P. ASHBOURNE, of Oakland, Alameda county, State of California, have invented a Process for the Preparation of Cocoa-Nut for Domestic Use; and I do hereby declare the following description sufficient to enable any person skilled in the art or science to which it most nearly appertains, to make and use my said invention, without further invention or experiment.

My invention relates to a novel and improved process for the preparation of cocoa-nut for domestic uses, and by this process I am enabled to so perfectly prepare the article that it will keep fresh many years.

In order to properly carry out my process I take any quantity of the nuts and carefully pare them. The meat is then grated or otherwise pulverized, and is then passed through fine screens or sieves, hot boiling water being added at the same time. The meat should then be subjected to hot steam for three or four hours until it is thoroughly cooked, after which it should be pressed perfectly dry. White sugar is then mixed with the meat in the proportion of one pound of sugar to three pounds of the meat. A small quantity of fine stick cinnamon is then added, and this has the effect to preserve the flavor. The compound is then dried gradually until it is fit for packing, and, if properly done, it will keep and retain its flavor for years without depreciation.

Having thus described my invention, what I claim, and desire to secure by Letters Patent, is—

The process of preparing cocoa-nuts for domestic use, substantially as herein described, and consisting essentially of first grating or pulverizing the meat, and then cooking by the direct action of steam, drying and sweetening the same.

ALEXANDER P. ASHBOURNE.

Witnesses:
GEO. H. STRONG,
JNO. L. BOONE.